US009128479B2

(12) United States Patent
Reichard et al.

(10) Patent No.: US 9,128,479 B2
(45) Date of Patent: Sep. 8, 2015

(54) AUTOMATION CONTROL AND MONITORING SYSTEM AND METHOD

(71) Applicant: ROCKWELL AUTOMATION TECHNOLOGIES, INC., Mayfield Heights, OH (US)

(72) Inventors: Douglas J. Reichard, Fairview Park, OH (US); Douglas W. Reid, Mentor, OH (US); Kenneth S. Plache, Scottsdale, AZ (US); Michael D. Kalan, Highland Heights, OH (US); Taryl J. Jasper, South Euclid, OH (US); Joseph Bronikowski, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 392 days.

(21) Appl. No.: 13/653,252

(22) Filed: Oct. 16, 2012

(65) Prior Publication Data

US 2013/0123944 A1    May 16, 2013

Related U.S. Application Data

(60) Provisional application No. 61/559,018, filed on Nov. 11, 2011.

(51) Int. Cl.
*G05B 11/01* (2006.01)
*G05B 19/418* (2006.01)

(52) U.S. Cl.
CPC  *G05B 19/41835* (2013.01); *G05B 2219/31161* (2013.01); *G05B 2219/31171* (2013.01); *G05B 2219/34246* (2013.01)

(58) Field of Classification Search
CPC ............... G05B 19/41835; G05B 2219/34246; G05B 2219/31171; G05B 2219/31161
USPC .............. 700/9, 18–20, 86–87; 717/100, 108, 717/113–116, 121
See application file for complete search history.

(56) References Cited

U.S. PATENT DOCUMENTS

| 5,315,709 | A  | * | 5/1994 | Alston et al. ........................... 1/1 |
| 5,634,129 | A  | * | 5/1997 | Dickinson ..................... 719/315 |
| 6,263,339 | B1 | * | 7/2001 | Hirsch ................................. 1/1 |
| 7,581,212 | B2 | * | 8/2009 | West et al. ..................... 717/136 |
| 8,869,100 | B1 | * | 10/2014 | Szpak et al. .................. 717/105 |
| 2002/0147611 | A1 | * | 10/2002 | Greene et al. ..................... 705/1 |
| 2010/0083226 | A1 | * | 4/2010 | Kowal ........................... 717/113 |
| 2011/0172838 | A1 | * | 7/2011 | Pai et al. ....................... 700/292 |

* cited by examiner

*Primary Examiner* — Ramesh Patel
(74) *Attorney, Agent, or Firm* — Fletcher Yoder, P.C.

(57) ABSTRACT

An automation control and monitoring system includes an operating system and a data model. The operating system is configured to receive a request for instantiation of an object representing an attribute of the automation control and monitoring system. The operating system is also configured to generate an object identifier when the request for instantiation is received, wherein the object identifier is unique from any other object identifiers employed by the operating system. The data model is configured to store and associate the object with the generated object identifier such that any component of the automation control and monitoring system may access the object by referencing the object identifier.

21 Claims, 7 Drawing Sheets

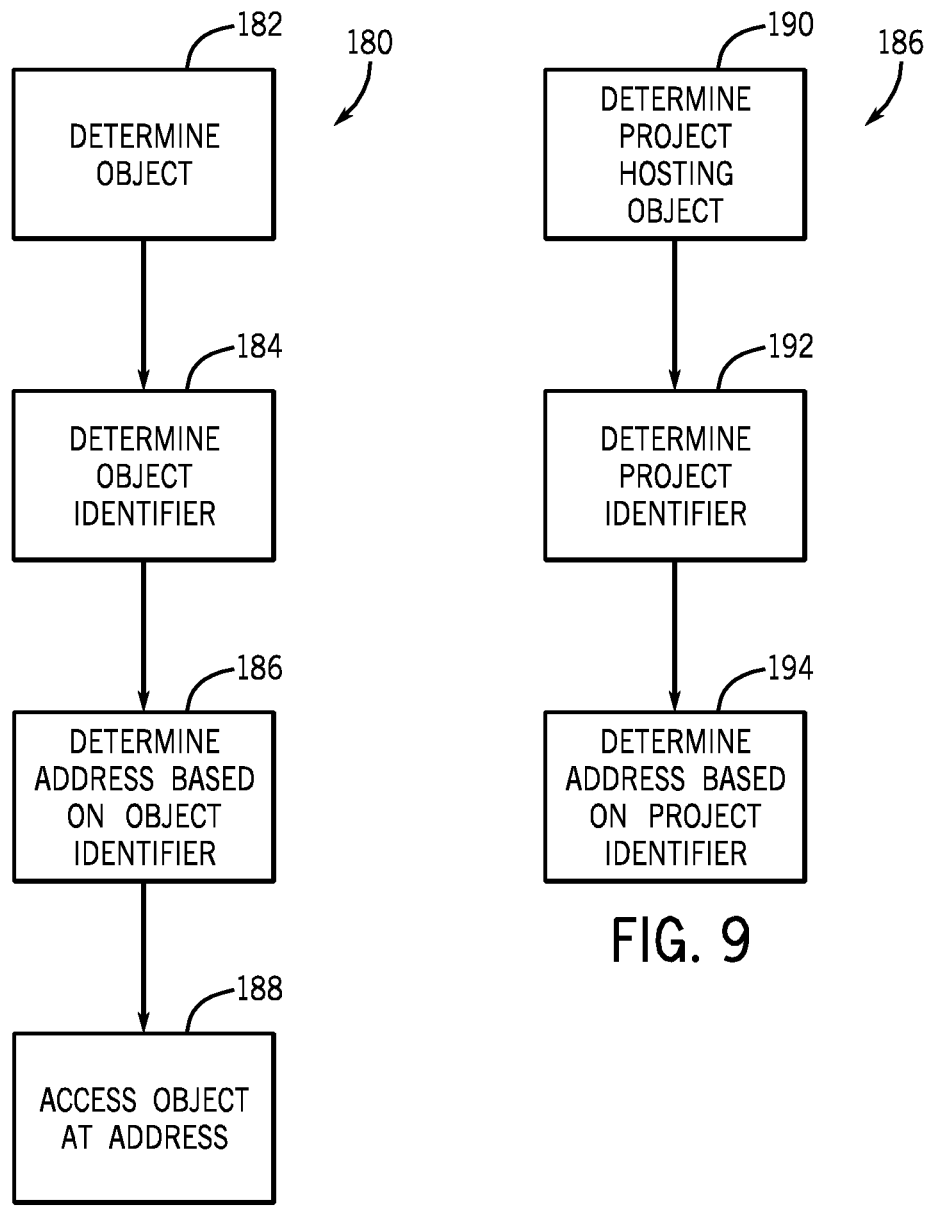

AUTOMATION CONTROL AND MONITORING SYSTEM AND METHOD

CROSS REFERENCE TO RELATED APPLICATIONS

This application is a Non-Provisional of U.S. Provisional Patent Application No. 61/559,018, entitled "Resource Identification Maintenance System and Method for an Automation Control System", filed Nov. 11, 2011, which is herein incorporated by reference.

BACKGROUND

Embodiments of the present disclosure relate generally to the field of automation control and monitoring systems. More particularly, embodiments of the present disclosure relate to identification of data objects within automation control and monitoring systems.

A wide range of applications exist for automation control and monitoring systems, particularly in industrial settings. Such applications may include the powering of a wide range of actuators, such as valves, electric motors, and so forth, and the collection of data via sensors. Typical automation control and monitoring systems may include one or more components, such as: programming terminals, automation controllers, input/output (I/O) modules, and/or human-machine interface (HMI) terminals.

The human machine interfaces or "HMIs" are commonly employed for monitoring or controlling various processes. HMIs may be employed in numerous different settings, such as in automobiles, aircraft, commercial settings, and a host of other applications. The HMIs may read from or write to specific registers such that they can reflect the operating state of various machines, sensors, processes, and so forth. The HMIs can also write to registers and memories such that they can, to some extent, control the functions of the process. In monitoring functions alone, little or no actual control is executed.

HMIs or interfaces of an automation control system typically employ objects, which are software components that may include an accessible or configurable element in a software environment. For example, objects may include self-sufficient programs that can be run as quasi-independent elements. Objects may include, among other things, device elements and data tags. Objects used in an interface may correlate to different controls, monitors, or any other parameter of an industrial automation device. Such objects may be particular instances of a general object type stored in the interface. Some of these objects may have visual representations on the interface devices, while other objects may not be visually represented but may be accessible for configuration and programming by a user. A user may desire to manipulate these objects, such as by creating new objects, copying objects, editing objects, etc., to create and customize an interface. It is now recognized that improved management of the identity of such objects, via the automation control and monitoring system, is desirable.

BRIEF DESCRIPTION

In accordance with one aspect of the disclosure, an automation control and monitoring system includes an operating system and a data model. The operating system is configured to receive a request for instantiation of an object representing an attribute of the automation control and monitoring system. The operating system is also configured to generate an object identifier when the request for instantiation is received, wherein the object identifier is unique from any other object identifiers employed by the operating system. The data model is configured to store and associate the object with the generated object identifier such that any component of the automation control and monitoring system may access the object by referencing the object identifier.

In accordance with another aspect of the disclosure, an automation control and monitoring system includes a data model configured to store and associate an object representing an attribute of the automation control and monitoring system with an object identifier. The automation control and monitoring system also includes a component configured to access the object by referencing the object identifier. The object identifier is generated by an operating system of the automation control and monitoring system and unique from any other object identifier in the data model.

Present embodiments also provide a method for accessing an object in an automation control and monitoring system. The method includes determining, via a processor of a component in the automation control and monitoring system, an object selected by an end-user. The method also includes determining, via the processor, an object identifier associated with the object, wherein the object identifier is unique from any other object identifiers in the automation control and monitoring system. Further, the method includes determining an address of the object based at least in part upon the determined object identifier, and accessing the object at the address.

DRAWINGS

These and other features, aspects, and advantages of the present invention will become better understood when the following detailed description is read with reference to the accompanying drawings in which like characters represent like parts throughout the drawings, wherein:

FIG. 8 is a process flow diagram of a method for accessing an object of a control and monitoring system in accordance with an embodiment of the present techniques; and FIG. 9 is a process flow diagram of a method for determining an address at which an object can be accessed in accordance with an embodiment of the present techniques.

DETAILED DESCRIPTION

Traditional automation control and monitoring systems include logical names, or object names used to identify data objects in the system. The objects can be accessed by automation controllers as well as HMIs and visualization platforms of the control and monitoring system. The objects are generally referenced via their associated object names. However, it is now recognized that this can lead to scenarios where references are broken within the system when an object name is changed in one component and not in all of the places where the object is referenced. In such instances, an operator would have to manually fix the names. Some control and monitoring system components utilize their own unique identifiers to maintain internal references to objects. However, when multiple such system components are integrated into a single system, object identities may only be unique within a scope of each individual component, and not the entire system. This may present difficulties for components that reference objects from multiple different system components. In addition, the identity mechanism for one system component may be different from or incompatible with those used in other system components.

Present embodiments are directed to maintaining object data by referencing a unique object identifier associated with each object of the control and monitoring system. Each object identifier is generated by a data storage component or identity component in response to a request for instantiation of a new object, and each object identifier is unique from all other object identifiers in the operating system. Further, each object manages a mapping back to identifiers (not unique) that may be used by individual components that have been integrated into the whole system. The objects are stored and associated with their object identifiers in a data model of the control and monitoring system. The data model may be distributed across different components of the system, such that changes to object data (e.g., object name) made in one component are distributed to all other components of the system. Any component of the control and monitoring system may access an object at an addressable location in the system by referencing the object's associated object identifier and using the mapping to the component-specific identifier. By managing references to objects via the object identifiers, which are not accessible to users, present embodiments of the control and monitoring system allow for efficient and flexible management of objects across different components of the system.

Figure 1:
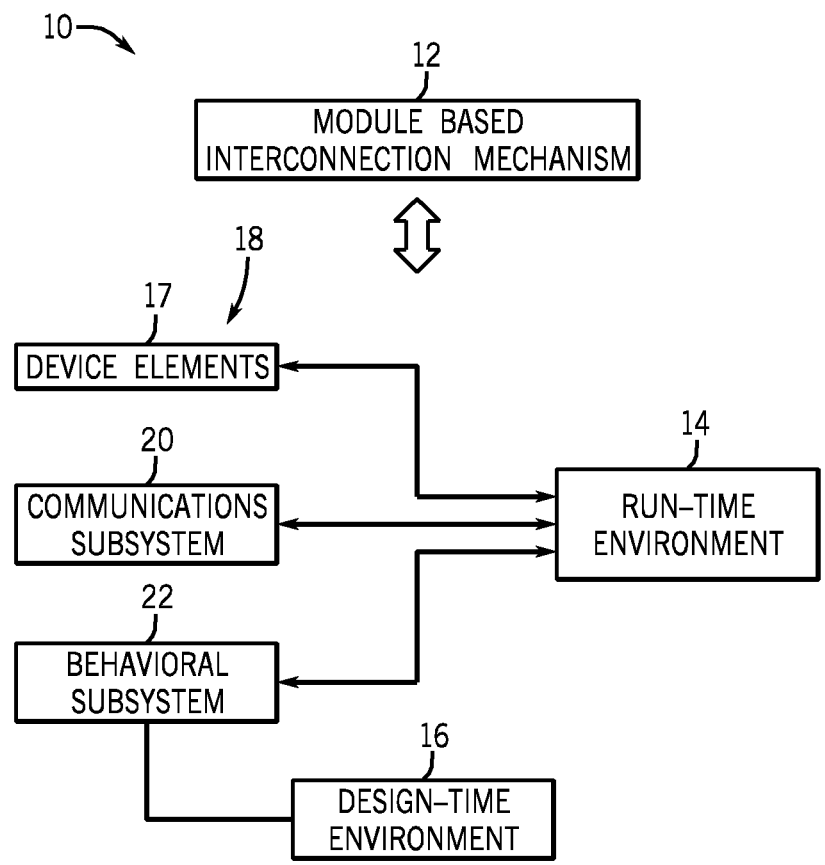
FIG. 1 is a general overview of a framework for portions of an automation control and monitoring system in accordance with certain aspects of the present techniques.

A number of facets, components and processes will be described throughout the following discussion. By way of introduction, a general system overview is in order that situates these features in context. FIG. 1 is a diagrammatical representation of a control and monitoring software framework 10 for an interface in accordance with an embodiment of the present disclosure. The framework 10 facilitates building functional software by utilizing a module based interconnection mechanism 12, which inherently supports dynamic manipulation and configuration. This dynamic manipulation and configuration ability facilitates efficient provision of feature-rich configuration environments for configurable interfaces. That is, as described below, individual device elements or objects are provided as stand-alone code that can be individually programmed, pre-written for use, as in a library, customized in their function and appearance in screens, and interconnected to provide information to a user as well as control and monitoring functions. In present embodiments, the objects include machine-readable data representative of an attribute of the automation control and monitoring system, and the objects are stored on a non-transitory machine-readable medium within the system.

The framework 10 includes two interrelated software environments that can (but need not) reside on a single system (e.g., computer). Specifically, a run-time environment 14 enables an operator (e.g., a human user) to interact with an application, such as a process during run-time (e.g., during use of the interface, typically during interaction with or observance of a process in operation). A design-time environment 16 permits a designer to configure the interface and its components. For example, a system may graphically present run-time information to an operator via the run-time environment 14 on a display (e.g., computer or interface device screen). Further, the system may include means (e.g., a keypad) for accepting operator input that can be detected and managed via the run-time environment 14.

The run-time environment 14 includes or provides access to device elements 17. The device elements 17 are software components that may include any accessible or configurable element in a software environment. For example, the device elements 17 include software components, such as "ActiveX" controls or ".NET" components that are managed by the run-time environment 14. "ActiveX" and ".NET" refer to object-oriented concepts, technologies and tools. Those skilled in the art will be well-acquainted with such programming approaches generally. In the present context, such standards should be taken as merely examples, and "device elements" should be understood as one example of any generally similar components or self-sufficient programs that can be run as quasi-independent elements, sometimes referred to as "objects" 18. Although device elements 17 are one particular type of object 18 that may be generated, stored, or acted upon throughout the control and monitoring system 24, it should be understood that the general principles described in this application are related to objects 18 in general, which may include other pieces of software (e.g., tags). Other standards and platforms exist for such elements, typically championed by different companies or industry groups.

Because such device elements are basic to certain of the concepts set forth herein, a few words of introduction are in order. Device elements generally include four features: properties, methods, connections (or connection points) and communications interfaces. Properties, in this context, are attributes that can be adjusted, such as to define an image or representation of the element in a screen view, as well as its location on the screen, and so forth. In this context, a method is an executable function (sometimes referred to herein as the elements "functionality" or "state engine"), and defines an operation performed by execution of the element. A connection, in this context, is a link between elements, and can be used to cause data (read from a memory or written to a memory) to be sent to another element. Present embodiments are directed toward systems and methods for managing device element identities and references, in order to establish and preserve such connections between device elements 17.

The device elements 17 may be stored at certain addressable locations of the control and monitoring system, and different components of the control and monitoring system may access one or more desired device elements 17 at these locations. Each device element 17 may include a system-assigned unique identifier associated with the device element 17, as described in detail below. Components of the control and monitoring system may access a particular device element 17 by referencing the element's associated identifier. This unique identifier is different from a textual name assigned to the device element 17, which may be input and/or changed by a user. The name associated with a device element 17 represents one of the adjustable properties of the device element 17, whereas the system-assigned identifier represents an attribute that cannot be changed.

Specific examples of device elements 17 may include software pushbuttons, timers, gauges, PLC communication servers, visualizations (such as screens that illustrate state of components within the automation control and monitoring system), and applications. In general, virtually any identifiable function may be configured as such an element. Moreover, as discussed below, such elements may communicate with one another to perform a wide range of display, monitoring operations and control functions. While device elements 17 associated with an image are quite useful, particularly for visualizations, many elements may not have a visual representation, but may perform functions within an HMI, such as calculations, or even management and data exchange between other elements.

The run-time environment 14 typically operates using a communications subsystem 20. The communications subsystem 20 is adapted to interconnect the device elements 17. In practice, the communications subsystem 20 may be thought of as including the connections of the device elements 17. However, it may include a range of software, hardware, and firmware that send data to and receive data from external circuits, such as automation controllers, other computers, networks, satellites, sensors, actuators, and so forth.

The run-time environment 14 typically operates using a behavioral subsystem 22, which is adapted to manage the behavior of the device elements 17. For example, responsibilities of the behavioral subsystem 22 may include the following: place and move device elements 17, modify device elements 17, group device elements 17 on interchangeable screens, save and restore screen layouts, manage security, save and restore connection lists, and supply remote access to the run-time environment 14. Here again, in practice, such behaviors may be defined as part of the profile (i.e., the "method" or "state engine") of each device element.

In presently disclosed embodiments, the design-time environment 16 may be used to configured the device elements 17 through various thick-client, thin-client, or Web-based implementations. For example, the design-time environment 16 may be implemented on a networked computer workstation or thin-client device that directly accesses the device elements 17 from a server. Such devices may then allow a designer to perform reconfigurations of the device elements 17 used in the run-time environment 14 when an interface is not operating. In some embodiments, the design-time environment 16 may include an advanced implementation of the behavioral subsystem 22 that facilitates direct or indirect manipulation of the run-time environment 14, without impeding or compromising the behavior of the run-time environment 14. That is, design and reconfiguration of the device elements 17 can be done even while an interface is operating. The behavioral subsystem 22 extends access to the run-time environment 14 via remote provision of the design-time environment 16, such as in a conventional browser. The behavioral subsystem 22 allows a designer to interact with and change aspects of the run-time environment 14 of an HMI via a remote programming terminal by serving the design-time environment 16 or aspects thereof to the programming terminal from the HMI. For example, an HMI coupled to a laptop via a network may provide a user with configuration capabilities by serving up a specific design-time environment 16 to the laptop via the network.

Details and examples of how this may be done are provided below. In current embodiments, the design-time environment 16 may be a product of combining Dynamic Hypertext Markup Language (DHTML) and an Active Server Page (ASP) server scripting to serve dynamic content to a browser. An ASP script is specially written code that includes one or more scripts (i.e., small embedded programs) that are processed on a server (e.g., Web server) before the page is sent to a user. Typically, in conventional usage, such script prompts a server to access data from a database and to make a change in the database. Next, the script typically builds or customizes the page before sending it to the requestor. Such scripting may be used in the present framework to build visualizations without prior knowledge of either the functionality of device elements 17, or their interrelationships.

By facilitating changes to device elements 17, the design-time environment 16 allows the designer to make interchangeable design-time models or specialized implementations of the behavioral subsystem 22. A specific example of a design-time implementation of the behavioral subsystem 22 includes a Web-based design-time environment 16, which extends access to a run-time environment 14 on an HMI via a TCP/IP connection between the HMI and a remote device. The Web-based design-time environment 16 facilitates management of the device elements 17 without compromising run-time performance or security. In one specialized implementation the behavioral subsystem 22 gives designers the ability to manipulate aspects of the run-time environment 14 using a Web browser that is capable of accessing a related interface or HMI. As noted above, this is achieved by using a combination of dynamic content, scripting, and configuration of the device element properties.

Figure 2:
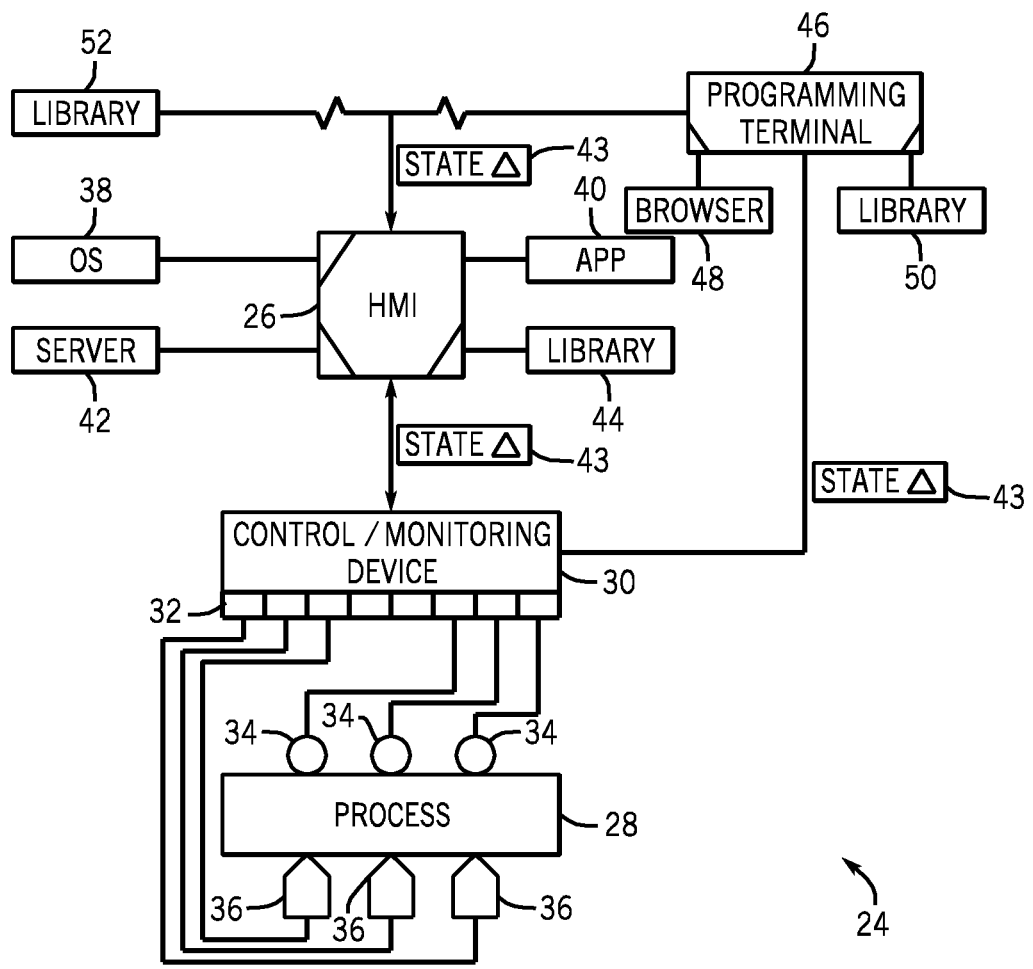
FIG. 2 is a diagrammatical overview of an automation control and monitoring system. in accordance with an embodiment of the present techniques.

FIG. 2 is a diagrammatical representation of a control and monitoring system 24, such as for industrial automation, implementing the framework described above in accordance with an embodiment of the present disclosure. The system 24 includes an HMI 26 adapted to interface with networked components and configuration equipment. The system 24 is illustrated as including an HMI 26 adapted to collaborate with components of a process 28 through a control/monitoring device 30 (e.g., a remote computer, automation controller, such as a programmable logic controller (PLC), or other controller).

Collaboration between the HMI 26 and components of the process 28 may be facilitated by the use of any suitable network strategies. Indeed, an industry standard network may be employed, such as DeviceNet or Ethernet, to enable data transfer. Such networks permit the exchange of data in accordance with a predefined protocol, and may provide power for operation of networked elements. As noted above, while reference is made in the present discussion to networked (wired or wireless) systems and to systems incorporating controllers and other equipment, the HMI 26 and programming techniques described may be equally well applied to non-networked components (e.g., GPS displays, game displays, cell phone displays, tablet displays, etc.) and to networked systems outside the industrial automation field. For example, the arrangements and processes described below may be used in facilities management, automotive and vehicular interfaces, computer numeric control (CNC) machines, point of sale (POS) systems, control interfaces for commercial markets (e.g., elevators, entry systems), and so forth, to mention only a few.

The run-time or operation environment 14 constructed and managed by a corresponding behavioral subsystem, is stored on and resident in the HMI 26. For example, such a behavioral subsystem can be adapted to load the application configuration framework (e.g., 10) from a storage location, such as during initial manufacture or setup of the HMI 26. When loaded, the stored application framework may be adapted to create screens and locate user interface device elements 17 (actual images or pictorial representations corresponding to the elements) in the screens. These applications, screens, and user interface elements are each types of device elements 17. The HMI 26 may include a stored application that dictates the layout and interaction of the device elements 17. The Web-based design-time environment 16, which is based on a run-time engine, may also be loaded and resident on the HMI 26. The design-time environment 16 may be adapted to handle advanced features (e.g., security management) for both design-time and run-time environments.

The HMI 26 may be adapted to allow a user to interact with virtually any process. For example, the process 28 may comprise a compressor station, an oil refinery, a batch operation for making food items, a mechanized assembly line, and so forth. Accordingly, the process 28 may comprise a variety of operational components, such as electric motors, valves, temperature sensors, pressure sensors, or a myriad of manufacturing, processing, material handling and other applications. Further, the process 28 may comprise control and monitoring equipment for regulating process variables through automation and/or observation. In general, the process 28 may comprise sensors 34 and actuators 36. The sensors 34 may comprise any number of devices adapted to provide information regarding process conditions. The actuators 36 may similarly include any number of devices adapted to perform a mechanical action in response to an input signal.

As illustrated, these sensors 34 and actuators 36 are in communication with the control/monitoring device 30 (e.g., an automation controller) and may be assigned a particular address in the control/monitoring device 30 that is accessible by the HMI 26. The sensors 34 and actuators 36 may be in direct communication with the HMI 26. The sensors 34 and actuators 36 may be utilized to operate process equipment. Indeed, they may be utilized within process loops that are monitored and controlled by the control/monitoring device 30 and/or the HMI 26. Such a process loop may be activated based on process inputs (e.g., input from a sensor 34) or direct inputs (e.g., operator input received through the HMI 26).

The server software on the interface permits viewing of the development environment, and direct reconfiguration of the interface (particularly of the device elements 17 and their associated appearance and functionality) without the need for special viewing or configuration software. This benefit flows from the fact that the device elements 17 and the design-time environment itself is resident in the HMI 26, and "served up" by the HMI 26 to a browser or other general purpose viewer on a programming terminal 46. In other words, necessary support for external computer workstations (e.g., laptop and desktop computers) may be reduced or eliminated. It should be noted that reference to a "browser" for viewing and modifying configuration of the interfaces is not limited to Web browsers or to any particular browser. References to a browser are intended to be exemplary. More generally, the term "browser" is utilized herein to reference software which includes any general purpose viewer.

The HMI 26, through the programming of the device elements 17 as described below, may be thought of as including instructions for presenting one or more screen views or visualizations, and device elements 17 executed upon interaction with the HMI 26 by reference to the screen views (e.g., pressing a button, touching a location of a screen, and the like). The screen views and device elements 17 may be defined by any desired software or software package. For example, the screen views and device elements 17 may be called by or executed by an operating system 38. The device elements 17, as discussed above, in accordance with present embodiments, may be objects 18 conforming to ".NET" or "ActiveX" or any other standards, or could use proprietary technology. The operating system 38 itself may be based upon any suitable platform, such as Linux, Microsoft Windows, Microsoft Windows CE, Android, iOS, OS-X, etc. As referenced herein, the device elements 17 and tools support Web services or technology for transmitting data over networks (e.g., the Internet). These device elements 17 thus follow a set of rules regarding information sharing and are adapted for use with various scripting and programming languages, as described below. Such device elements 17 enable provision of interactive content to outside applications such as a LAN, WAN, an intranet, an extranet, or even the World Wide Web. Accordingly, the operating system 38 and the various device elements 17 facilitate dynamic configuration of the HMI 26 through a browser 48 by allowing configuration access (e.g., serving up) to the browser 48.

For example, such configuration access includes access for instantiation of device elements 17. In other words, new device elements 17 can actually be created and implemented from the browser 48. Again, it should be noted that the browser 48 does not require actual functional access. Indeed, in one embodiment, requests via the browser 48 result in a "draw" sequence of operations based on data functionality and content of device elements 17 in a container, thus allowing illustration of the device element representations and access to their configuration without actually serving up functional aspects. This allows for configuration via a remote workstation without necessitating technical support for the remote workstation.

Instantiation of the device elements 17 or objects 18 may occur via the operating system or processor resident in a component of the control and monitoring system 24. For example, as noted above, the browser 48 may facilitate access for a user to instantiate certain objects 18 within the HMI 26. The user may provide, via the programming terminal 46, a request for instantiation of an object 18 in the HMI 26. The operating system 38 of the HMI 26 is configured to receive such a request for instantiation and respond by generating an object identifier when the request for instantiation is received. The object identifier may be a number or some other identifier that is unique from any other object identifiers employed by the operating system 38. In certain embodiments, the object identifier is unique from any other object identifiers previously generated by the operating system 38 to ensure that the object identifier generated for each object is indeed unique. This may be achieved by various techniques that account for existing object identifiers. For example, sequential identifiers may be issued without repeating object identifiers.

A data model of the control and monitoring system 24 is configured to store and associate the objects 18 with the generated object identifiers. The data model may be located in a memory of the HMI 26 and/or the control/monitoring device 30, and multiple data models or copies of a data model may exist throughout the different components of the control and monitoring system 24. These data models may store one or more of the objects 18 at different addressable locations throughout the system. Any component of the control and monitoring system 24 may access an instantiated object 18 by referencing the object identifier associated with the object 18. Each component (e.g., HMI 26 or automation controller) that accesses the object 18 via the object identifier may automatically receive changes made to the object 18 by another component of the automation control and monitoring system 24. This allows changes to the objects 18 in one component to propagate to all other components. The object identifiers themselves do not change, however, and are used by the system to reference data associated with the objects 18 and to distribute changes to the objects 18.

In addition to the operating system 38 and device elements 17 as described above, the HMI 26 includes an application or application layer 40. The application 40, which may itself comprise a device element 17, facilitates access to and acquisition of information from the various device elements 17 of the HMI 26. In particular, the application 40 represents a first level in a multi-level device element that can be enumerated for execution. The application 40 in a practical implementation may comprise a user application in a variety of forms (e.g., XML, HTML, JSON, or proprietary). The user application is then interacted with by the user or operator, as well as by the designer.

The screen views and device elements 17 may be described as independent executable pieces of software. In a present implementation, the screen views are defined by appropriate code written in a markup language (e.g., Hypertext Markup Language or HTML). Thus, the configuration of graphical interface screens for the HMI 26 may be performed without the use of conversion programs. Further, by programming of the device elements 17, the screen views may be developed directly on the HMI 26 via resident server software (designated as server 42) that makes the resident development environment available for remote access. Specifically, in one embodiment, representations of certain device elements 17 (e.g., ActiveX controls) are served up to the browser 48 without serving up the software components themselves. Because a development or design-time environment may be accessed via the browser 48, the need to download changes to the screens and to update remote configuration software applications can be eliminated. It should be noted that this browser-based software configuration is an example of one type of software for use with the HMI 26, and the present disclosure is not limited to operation via this configuration. That is, the meta-data 47 described in present embodiments may to be applied in software schemes that are not implemented via a browser (e.g., 48).

As noted above, device elements 17 may include functionality by which they read from or write to specific memory or registers of memory, typically in other devices (but which could also be within the HMI 26). For example, a particular function may correspond to writing to or reading from one of the addressable registers 32 of the control/monitoring device 30. In a simple case, for example, an object accesses a piece of data (e.g., a state of a component as determined by one of the sensors 34), and generates an output signal to write a value corresponding to the state of a different networked device. Such state information may be communicated via state deltas 43. For example, in the embodiment depicted in FIG. 2, the control/monitoring device 30 and HMI 26 may communicate state information using state deltas 43. Further, the programming terminal 46 may communicate state information with the HMI 26 and control/monitoring device 30 using the state deltas 43. In present embodiments, the addressable registers 32 may be referenced via unique identifiers, as opposed to textual names, to provide access to data stored therein. Such identifiers, as described in detail below, may be unique within a scope of the particular control/monitoring device 34, and may later be resolved into a system-wide unique identifier.

In the control environment, the state of various objects 18 (e.g., control programs, tags, module configuration, and HMI screens) of the control and monitoring system 24 may be stored in memories (e.g., hard drives, read-only memory, and/or random-access memory) of various components of the control and monitoring system 24 (e.g., a programming terminal 46, the control/monitoring device 30, I/O modules, and/or HMI terminals 26). As changes are made to the state information of the control environment objects 18, the state information may need to be synchronized with the state information residing on the other components, such that the components may continually understand the state of the objects 18 within the control and monitoring system 24. In accordance with present embodiments, to stay apprised of state information, automation components that store state information may receive data referred to as state deltas 43 (e.g., state elements that have changed), while not receiving state elements that have not changed and thus are already present in the stored state information on the various components storing the state information. For example, state deltas 43 may include any data that has changed due to an action within the control and monitoring system 24. By providing the state deltas 43 and not providing the unchanged state information, increased efficiency may be observed. For example, in a traditional control and monitoring system 24 with 100 state elements, each of the 100 state elements may be provided to each component storing that object's state information. By only providing the state deltas 43, components of the control and monitoring system 24 may only transmit data for the elements that were changed. Thus, if only one element of the 100 state elements is changed, the 99 other elements would not be transmitted, thus reducing network traffic relative to traditional systems. Further, providing only the state deltas 43 may reduce the potential of inadvertently overwriting state change information that is generated elsewhere within the control and monitoring system 24. For example, in the case of the 100 state elements mentioned above, when all 100 state elements are transmitted to the other components, the 99 unchanged elements may result in an overwrite of changes made to one of those 99 components elsewhere. By providing only the changed elements (e.g., the state deltas 43), the 99 unchanged elements will not be affected by the one element that was changed and communicated to the other components.

In an industrial control and monitoring context, device elements 17 may emulate operation of a range of physical components, such as a momentary contact push button, a push button with delayed output, a switch, an analog meter display, and so forth. Many pre-programmed device elements 17 may be available for use by the HMI 26. Such functional modules may be accessible via a network, or may be resident on the HMI 26, or resident on a separate device directly linked to the HMI 26. In this way, an HMI supplier or software supplier may provide many possible building blocks from which screens and complex control and monitoring functions may be programmed. Indeed, a library 44 of available device elements 17 may reside on the HMI 26 to facilitate configuration of the HMI 26. The screen instructions may call upon the device elements 17 or objects 18 for performing desired functions based upon operator inputs, and these instructions may be programmed into versions of the pre-programmed elements. For example, the operator may provide initiating inputs by touching a location on a touch screen or depressing keys on a keyboard. Based upon the screen instructions and the device elements 17 or objects 18 associated with the instructions (e.g., with specific locations triggering calls or execution of pre-configured device elements 17), the desired functions may then be executed. Accordingly, the operator is enabled to interact with a process, typically to change screen views, write to registers, or command the generation of other output or control signals. In a stand-alone implementation, the interactions may simply recall or store data, change screens, and so forth.

One or more separate interface screens may be employed, with some HMIs having many such screens and a great number of device elements 17. Each device element 17 may, in turn, be uniquely programmed to consider specific inputs, perform specific functions, and generate signals for specific outputs. A plurality of such device elements 17 can be loaded and hosted in a single software "container" (e.g., ActiveX container) as described below.

In present embodiments, each of the device elements 17 or objects 18 includes an object identifier, to facilitate the internal management of objects 18 referenced by components of the control and monitoring system 24. The object identifier may act as the primary key for identifying the objects 18 within the control and monitoring system 24, as well as managing references between the objects 18. The object identifier may be a number assigned by the control and monitoring system 24, unique from any other object identifiers in the system. Consequently, the same object identifier may be used to identify the object 18 in the HMI 26, the control/monitoring device 30, and/or the programming terminal 46. Any of the system components (e.g., control/monitoring device 30, HMI 26, programming terminal 46) may be configured to access the objects 18 at a specific address by referencing the object identifier associated with the object 18. For example, the HMI 26 may access an object 18 in this way to provide state information represented by the object 18 for generating a visualization on the HMI 26. As previously discussed, the object 18 may be referenced by other objects 18, such as in the control logic of the control/monitoring device 30. Although different system components may access the object 18 by referencing the associated object identifier, this object identifier may be inaccessible (or not visible) to a user. As a result, the user cannot manipulate the internal object identifier.

In order to maintain the uniqueness of each object identifier within the system, the object identifiers are assigned by the control and monitoring system 24 upon creation of the object 18. In certain embodiments, the object identifier is generated using a globally unique identifier (GUID) algorithm. This may entail an operating system (e.g., 38) of the control and monitoring system 24 using a 32-bit pseudo-random number generator to generate a number for each new object 18 stored within the control/monitoring device 30. The number may be utilized as the primary database key for the management of all the objects 18, and their properties, throughout the control and monitoring system 24. That is, each of the objects 18 may be stored and maintained within a data model that is organized according to the unique object identifier number associated with each object. Further, this data model may be distributed throughout the different components of the control and monitoring system 24, allowing all of the system components to access desired information relating to a particular object 18 by referencing its object identifier. The object identifiers may be implemented and referenced using different programming technologies (e.g., C++, Java, and/or C#). In embodiments where the object identifiers are to be guaranteed unique across all of the system components, it is important for the numbers not to be reassigned once they are given. For example, any time an object 18 is replicated (e.g., via copy/paste functionality), a new object identifier is assigned. A user may use a copy/paste function via the programming terminal 46 to send a request for instantiation of a copy of the object 18 to the operating system 38. Upon receiving the request for instantiation of a copy of the object 18, the operating system 38 may generate another unique object identifier for association with the copy of the object 18 in the data model. If one of the objects 18 is deleted, its object identifier may be maintained as long as there remain references to the object 18 within the control and monitoring system 24 (e.g., other objects referencing the deleted object via its object identifier). However, if all references to the deleted object are also deleted, the object identifier is no longer present in a database of the system. In certain embodiments, a deleted object identifier may be reissued to a new object upon instantiation of the new object.

It should be noted that the unique object identifier may include an object identifier that is assigned based on identifiers that are unique at other levels (e.g., project, component, etc.) of the control and monitoring system 24. In some embodiments, for example, a unique identifier used to manage references to the object on the level of the entire system may be based on a project-level object identifier. That is, a project that is loaded onto the control and monitoring system 24 may already include a number of objects 18 that are identified uniquely at the project level. The objects 18 of the project each have their own unique identifiers that are not visible to a user for maintaining connections between these objects 18 within the project. When the project is connected to the control and monitoring system 24, the operating system 38 may instantiate the objects 18 of the project at the system level by assigning a unique system-level object identifier to each of the objects 18. These object identifiers are based on at least the project-level object identifiers and a project identifier associated with the project. For example, the object identifier assigned to an object may include the unique project-level object identifier with a number (identifying the project within the system) appended to the project-level object identifier. As another example, there may be a unique system-wide object identifier assigned to an object 18 via a mapping that takes into account both the project in which the object 18 is located and an identity of the object 18 within that project. Other projects or components may then reference the object via its abstracted system-level object identifier. The operating system 38 may be able to generate system-level object identifiers using the same format for each object, even if the objects are maintained according to different formats within the individual projects or components. This results in streamlined object identity management throughout the control and monitoring system 24.

The object identifiers may be utilized to propagate changes to the objects 18 throughout the control and monitoring system 24. Because each object 18 includes a unique identifier, the system is able to maintain a consistent data model across its different components. This distributed data model may allow changes made to the data model in one component to propagate to all the others. Changes may be propagated from the control/monitoring device 30 to the HMI 26, from design-environment software components to real-time components, etc. As changes are made to the objects 18 and propagated (e.g., via state deltas 43) throughout the system wherever the objects 18 are referenced, the object identifiers remain consistent.

It may be desirable for a user to access a particular object by referencing an object name associated with the object 18, this object name being accessible to the user while the object identifier remains inaccessible. In other words, the object name may be a textual name that the user can actually see (e.g., on a screen of the HMI 26). Each object name points to one of the unique object identifiers of the system. The object names are stored in the data model along with the other data of the objects 18 and their associated object identifiers. When a user desires to configure an object 18, the user may access the object 18 by referencing the object name or logical name associated with the object 18, as this is the name that appears on the programming terminal 46. The user may access the object 18 via the HMI 26 or the programming terminal 46, using an object browser (e.g., 48) or in some cases by directly inputting the desired object name. The control and monitoring system 24 then executes any desired configuration by referencing the object identifier. The object names may be textual names that are assigned by a user of the control and monitoring system 24. In some embodiments, the object names may be provided by the control and monitoring system 24. For example, the object 18 may be generated using a specific object type stored in the library 44, where the object type includes a default textual name. Although the control and monitoring system 24 itself accesses the object 18 from a data model by referencing the object identifier, historical logs of the data associated with certain objects 18 may be visibly arranged according to the object names associated with the objects 18. For example, a user may request a historical log of data related to certain objects 18 via the HMI 26. The operating system 38 may request the data from various components (e.g., control/monitoring device 30) by referencing the object identifiers associated with the objects 18. The HMI 26 then provides a visualization of the data received from the components, arranged according to the object names. This allows the object identifiers to remain invisible to the user.

At times, it may be desirable for a user to change the object name associated with a particular object 18. For example, the user may wish to include more descriptive names for the objects 18 within the control and monitoring system than the object names provided during initial configuration and instantiation of the object 18. In certain instances, a user may select a different localized language for the text displayed on a screen (e.g., on the HMI 26), and wish to extend the change in localized language to the textual object names displayed on the screen. Since all components of the automation control and monitoring system 24 access objects 18 by referencing the associated object identifiers, the object names may be changed without affecting operation of any components accessing the objects 18. This includes operations in the control/monitoring device 30 as well as in the HMI 26. That is, the control/monitoring device 30 may maintain current process operations by referencing the unchanging object identifiers of the objects 18 used in its control logic. Simultaneously, the HMI 26 may update a view with the new object names by referencing the same unchanging object identifiers. The name changes may propagate to the names of shortcuts used to provide access to the object data as well. Changes made to the object names in the data model of the control/monitoring device 30 (e.g., via programming terminal 46) are distributed to the data model within the HMI 26, even when visualizations referencing these objects 18 are not open on the HMI 26. In this way, a user may rename any object referenced throughout the control and monitoring system 24, and the system continues to run using the new name, without the name change affecting inter-object references.

The HMI 26 may be configured by interacting directly with a panel or screen on the HMI 26 itself (if one is present), but in many cases configuration will be performed remotely from the programming terminal 46. For example, access is provided directly to the resident library 44 and/or operating system 38 and application 40 via a browser 48 or similar application. In a present implementation, no other specialized software is required at the programming terminal 46. Indeed, the server 42 resident on the HMI 26 may provide access to the device elements 17 in the library 44. By storing the device elements 17 in the library 44 directly on the HMI 26, the risk of version conflicts and so forth may be reduced. Additionally, the HMI 26 may be directly connected to the programming terminal 46, or accessed by reference to an IP address (Internet Protocol address) assigned to the HMI 26.

Access control schemes may be used to limit the ability to change screens and device elements 17. For example, a password or user access status may be required to gain such access. Further, in certain embodiments, the programming terminal automatically recognizes the HMI 26 or the terminal on which the HMI 26 is resident as a device upon being coupled to the programming terminal 46 (e.g., similar to an external memory or drive). Thus, once connected to the programming terminal, the HMI 26 may simply be "recognized" as a device that can be accessed (providing the configuration screen and tools described below).

Once the device elements 17 then resident on the HMI 26 are accessible to the programming terminal 46, aspects of the HMI 26 can be modified or updated directly on the HMI 26 via the communication link from the programming terminal 46. For example, a user may wish to update a particular HMI graphic to provide data, such as historical data or trending relating to information being received from a newly installed sensor 34. Additionally, the user may find it desirable or convenient to update the HMI graphic for presentation of such data while in an off-line mode (e.g., without immediately implementing the changes). In such a scenario, the user may link to the library 44 of available device elements 17 via the programming terminal 46 and use them to modify the HMI graphic or functionality in a development environment.

It should be noted that additional device elements 17 can be added to the library 44. For example, if a trending device element 17 is not resident on the HMI 26, a user can download such an element to the HMI 26 from a configuration library 50 resident on the programming terminal 46. Alternatively, a user could access the trending device element 17 from a resource library 52 accessible via a network (e.g., the Internet), either directly to the HMI 26 or through the programming terminal 46. This may be particularly beneficial because new and improved device elements 17 can be downloaded to the HMI 26 individually and on a periodic basis, thus adding new functionality without necessitating the periodic release of new conversion programs or HMI operating systems, or run-time or design-time environment software. The development environment may provide links to such libraries. Further, in embodiments using embedded code (e.g., operating system, server software, device objects, etc.), because the embedded code resides on the HMI 26, version conflicts with the embedded code may be avoided and the necessity for programming terminal software upgrades may be reduced.

To track the state information of the one or more components of the control and monitoring system 24, the components of the control and monitoring system 24 may use a distributed data model representing various aspects of the control and monitoring system 24. For example, the distributed data model may enable multiple cached copies of a data model representing the control and monitoring system 24 to exist within the control and monitoring system 24 (e.g., at one or more of the components of the control and monitoring system 24). The distributed data model may work in conjunction with delta scripting and distributed command handling. The delta scripting may enable one or more components of the control and monitoring system 24 to determine state changes to the data model, generate a delta script that contains only the changes to the data model and/or the entire data model, and provide the delta script to other components of the control and monitoring system 24. The other components may consume the delta scripts and apply the data contained within the delta scripts to a locally cached copy of the data model (e.g., distributed copy contained at one of the components of the control and monitoring system 24).

Figure 3:
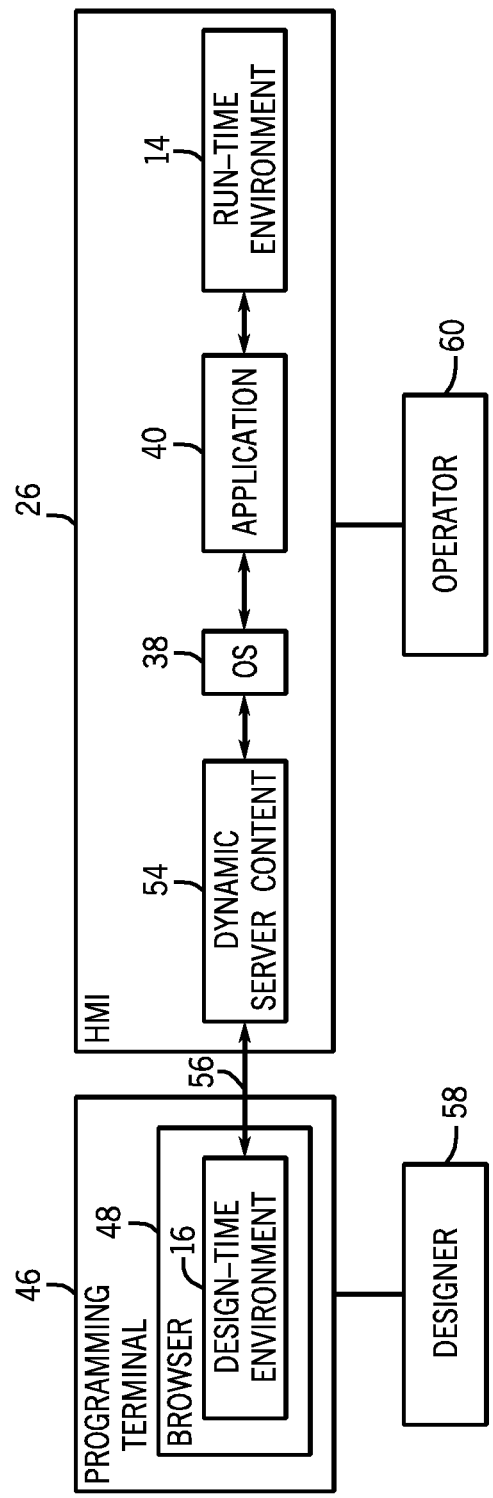
FIG. 3 is an overview of certain of the functional components in an interface and a programming terminal in accordance with an embodiment of the present techniques.

To better illustrate the relationship between the design-time and run-time environments, FIG. 3 provides a high-level flow diagram representing interaction between the HMI 26 and the programming terminal 46. In general, a platform for the HMI 26 and programming terminal 46 will include the operating system or executive software 38, application software 40, as well as any communication software, a microprocessor, a network interface, input/output hardware, generic software libraries, database management, user interface software, and the like (not specifically represented in FIG. 3).

In the illustrated embodiment, a design-time platform and a run-time platform interact within the HMI 26. The design-time platform provides views that are served as the design-time environment 16 to a desktop personal computer platform (e.g., running a suitable operating system 38, such as a Microsoft Windows OS, MAC OS, or Linux) and the run-time platform cooperates with the design-time platform via the operating system (e.g., a Microsoft Windows OS, MAC OS, iOS, Android, or Linux). The design-time platform provides dynamic server content 54, while the run-time platform displays views on the HMI 26 itself (if a display screen is provided on the HMI 26). The design-time environment 16 may be displayed in the browser 48 (e.g., Web browser or other general purpose viewer), or the design-time environment 16 may be implemented as an application that is not contained in the browser 48.

FIG. 3 represents at a very high level how the design-time environment 16 interacts with the operating system 38, application 40 and run-time environment 14. The arrow 56 represents dynamic exchange of content between the HMI 26 and programming terminal 46. In general, interaction with the design-time environment 16 is the task of a designer 58 who initially configures the HMI screens or visualizations, device elements 17, their functions and interactions, or who reconfigures such software. The designer 58 may be enabled to initially provide or to change object names assigned to the various device elements 17 or objects 18 in the design-time environment 16. The run-time environment 14 is generally interacted with by an operator 60 directly at the HMI 26. The operator 60 may be able to view changes to the object names that are displayed on the HMI 26. In certain embodiments, the operator 60 may select a new localized language for the run-time information displayed on the HMI 26. It should be noted that while the design-time environment 16 has specific needs, in certain embodiments, it may depend heavily on the operating system 38, application 40 and run-time environment 14. The design-time environment 16 and the run-time environment 14 may utilize certain base technologies (e.g., DHTML, HTML, HTTP, dynamic server content, JavaScript, Web browser) to operate respectively in the design-time platform and run-time platform. While, in the illustrated embodiment, the run-time environment 14 and the design-time environment 16 reside on separate platforms, in some embodiments they may reside on the same platform. For example, the design-time platform and run-time platform may be configured as or considered a single platform.

In present embodiments, changes to the object names made in one component may be automatically distributed to all other system components accessing the objects 18 via their object identifiers, without any intervention by the user. For example, the designer 58 may change an object name in the control/monitoring device 30, either while the control/monitoring device is offline or online. The change is automatically sent to the HMI 26, and the designer does not have to manually fix the name change within the HMI 26. The name change will become immediately visible to the operator 60 with little or no change in control operations of the control/monitoring device 30. This is because the object names are basically attributes associated with the object identifiers. The object names, along with the other attributes of the objects 18 and references to the objects 18, are managed throughout the system on the basis of these object identifiers.

In one embodiment of the present invention, a design-time Web implementation is utilized. This design-time Web implementation offers the speed and flexibility of software running on the design-time platform by using a Web browser (e.g., 48) with DHTML support from the HMI, as noted by the dynamic server content 54 in FIG. 3 and as described below. DHTML is used to perform dynamic manipulation of Web content in the design-time environment 16. Further, the dynamic server content 54 is used in the HMI to serve dynamic Web content to the design-time environment 16. This dynamic client-server environment allows the Web browser to simulate an application running on the design-time platform without requiring a piece of software compiled for a related processor. In other embodiments, the design-time environment 16 may be directly accessed over the server via a networked client device, instead of through a Web-based implementation.

Figure 4:
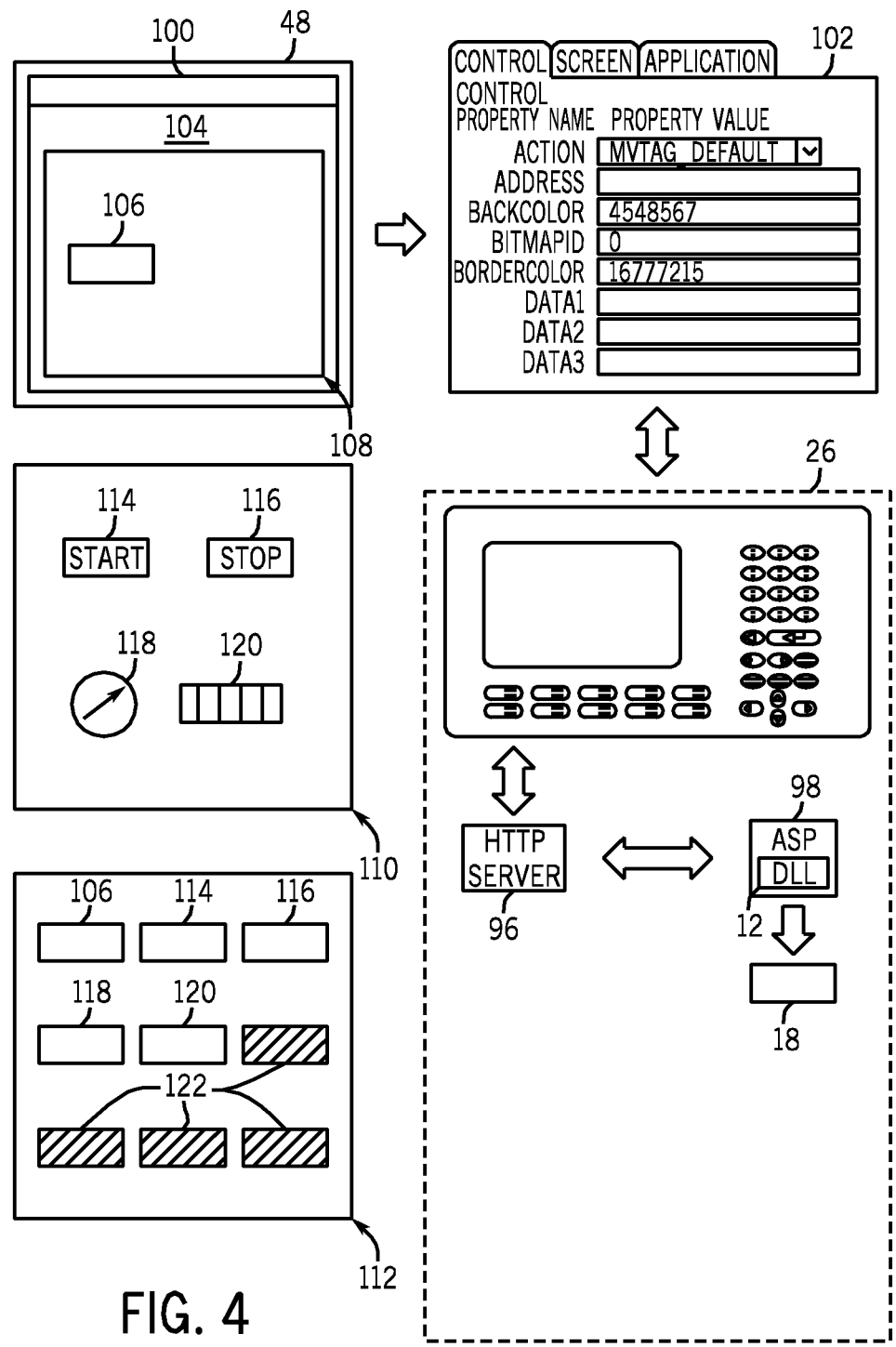
FIG. 4 is an overview of certain views or containers of device elements in accordance with an embodiment of the present techniques.

FIG. 4 is a diagram illustrating one or more device elements in a design-time environment in accordance with embodiments of the present techniques. The diagram includes interactions illustrated by relationships between a display 100 (e.g., a screen for browser display), a property editor 102, and the HMI 26.

The design-time environment represented by the configuration screen or display 100 includes static content 104 and dynamic content. The dynamic content includes images corresponding to any displayed or represented device elements 106 (e.g., virtual on/off button, gauge). In one embodiment, an image is specified by an image tag in HTML and is part of a JPEG file created by the HMI 26. The image tag may reference an object identifier associated with an object 18 in a data model of the control/monitoring device 30. A processor of the HMI 26 may determine, based on the object identifier, an addressable location of the object 18 within the system so that the image tag can access the object 18 at this addressable location. The static content 104 of the screen 100 may be created by the ASP server or it may preexist in an HTML file. It should be noted that, in some embodiments, designated designers only can edit the static content 104.

In the representation of FIG. 4, the device element representation 106 is contained within a view container 108. As will be appreciated by those skilled in the art, a container generally defines a portion of a processing space in which certain device elements are opened and ready for use. The container 108 may thus correspond to a first view container that includes only the elements viewable within the current screen. As discussed above, many such screens may be provided in the HMI 26. Other screens, such as alternative control or interface screens may be provided in other view containers, such as a container 110. In general, to speed the operation (e.g., changing between screen views) of the HMI 26, such view containers are predefined and associated with one another by definition of the individual device elements with which they are either associated or within which representations of the device elements are provided. A global container 112 may be defined to include all of the device elements necessary for the various view containers, as well as other elements that may not be represented in any view container. As illustrated in FIG. 4, therefore, view container 108 includes the virtual button 106 which performs a "jog" function and is manifested by a representation in a first screen. The new container 110 includes several components, such as a "start" button 114, a "stop" button 116, a virtual gauge 118 and a digital readout 120. The global container 112, then, will include all of these device elements for the various view containers, as well as any device elements 122 that are required for operation of the viewable device elements but that are not themselves viewable. Such device elements may include elements that perform computations, trending, communications, and a wide range of other functions.

FIG. 4 also illustrates a property editor 102 in which a user may access various properties of the element 106. As discussed above, the element 106 may also include connections and text associated with the element 106, which may also be configured by the user via an editor, similar to the property editor 102. The user may configure or update object names, which may be displayed in the screen 100 and/or used in the control logic of the control/monitoring device 30. In certain embodiments, the user may utilize the property editor 102 to select one of many localized languages for the textual information visible on the property editor 102 and/or the screen 100.

In an embodiment, the property editor 102 may interact with the HMI 26 via a query string from the browser (e.g., browser 48 of FIG. 2) to a server 96 (e.g., HTTP server) that is resident on the HMI 26. The server 96 cooperates with an ASP server 98 including the module based interconnection mechanism 12, such as a dynamic-link library (DLL) to receive and respond to queries. The DLL allows for storage of executable routines as separate files, which can be loaded when needed or referenced by a program. In the example set forth above, upon receiving the call, the page is reloaded by the ASP server 98 and the query string is initially parsed, resulting in evaluation of the move command. Server side scripts then access the device element 17 represented by the image 106 and update its location property. The new property information is then updated on the page and the page is passed to the browser 48.

Figures 5, 6:
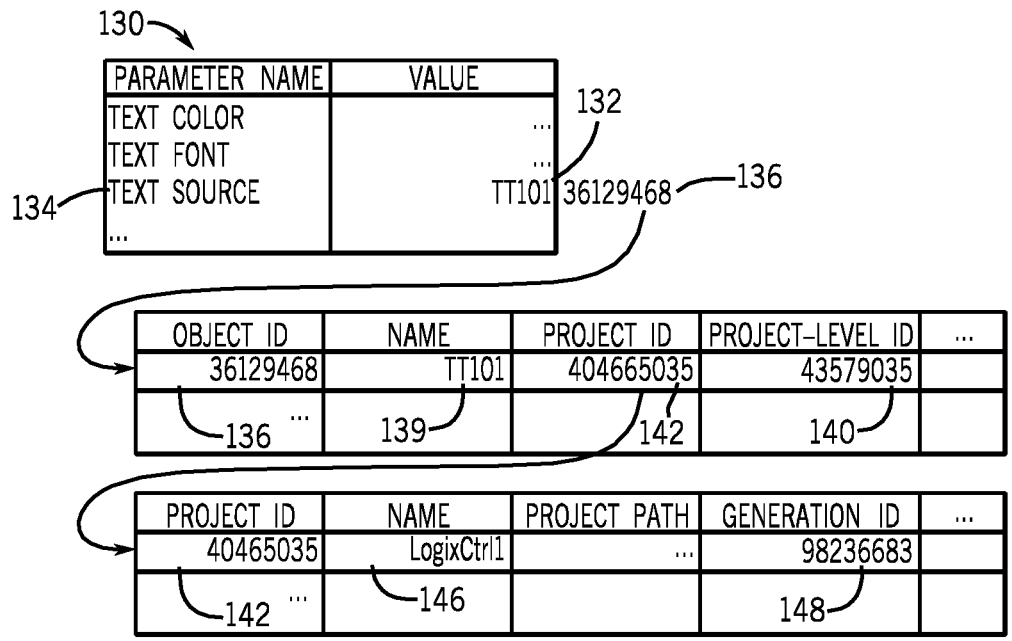
FIG. 5 is a view of a screen illustrating an object having an associated object identifier and object name in accordance with an embodiment of the present techniques.
FIG. 6 is a table illustrating two object identifiers with related identifiers internal to a control and monitoring system in accordance with an embodiment of the present techniques.

Having now discussed the benefits of maintaining references to the objects 18 within a control and monitoring system 24 via unique object identifiers, we will discuss ways in which the objects and their object identifiers may be arranged in a data model throughout the control and monitoring system 24. As an example, FIG. 5 illustrates a possible partial configuration for a device element 17 on an HMI screen 130, showing an object name 132 associated with an object 18 in the control and monitoring system 24. In the illustrated embodiment, the object name 132 is "TT101", provided as the text source 134 corresponding with the object 18. This object name 132 is accessible to a user, who may reference the object 18 by selecting or inputting the object name 132. Once the object name 132 is input by the user, the system manages the association though an object identifier 136. When the system accesses the object 18 (e.g., for configuration or requesting state information), the control and monitoring system 24 accesses the object 18 at an addressable location based on its object identifier 136. The object identifier 136 is not displayed on the screen 130 because it is generally inaccessible to the user; instead the control and monitoring system 24 uses the object identifier 136 to retrieve the object name 132 that is displayed to the user. If the user changes the object name 132, or changes the localized language, the object identifier 136 will remain consistent so that references to the object 18 are maintained, even though the text source 134 updates to show the new or localized object name.

In some embodiments, the control and monitoring system 24 may include multiple projects supported by the same HMI 26. Each project may define the interactions of the HMI 26 with a different control/monitoring device 30 linked with the HMI 26. This may be accomplished through references to the objects 18 within the different projects in the HMI 26. In such systems, the objects 18 may be identified via object identifiers of varying scope, such as system-level identifiers and project-level identifiers. FIG. 5 illustrates the interaction of these identifiers of varying scope.

In the illustrated embodiment, the object identifier 136 is associated with a project-level object name 139, a project-level object identifier 140, and a project identifier 142. In certain embodiments, the object identifier 136 may be generated by an operating system based at least in part on the project-level object identifier 140 and the project identifier 142. The project-level object identifier 140 may be identified by the operating system 38 in response to the request for instantiation of an object 18 representing an attribute of a particular project. The project-level object identifier 140 is unique from any other project-level identifiers in the project. In this way, the project-level object identifier 140 is valid for referencing the object 18 only within the scope of the particular project. The project-level object identifier 140 may be generated based on a variety of algorithms (e.g., a GUID algorithm), although the project-level object identifier 140 may not be guaranteed to be system unique. The project identifier 142 identifies the project within the control and monitoring system 24 and is unique from any other project identifiers in the system. The project identifier 142 may be generated by the operating system in response to a request for instantiation of an object of the project when the project reference is first added to the HMI 26, or when the control/monitoring device 30 corresponding with the project is linked with the HMI 26.

In the illustrated embodiment, the project-level object name 139 is the same as the object name 132 (which is a system-level object name). However, in certain embodiments the project-level object name 139, which is the name associated with the object 18 at the project level, may be different from the system-level object name 132. The system-level object name 132 in some instances may be a mapping of the project-level object name 139 into a different namespace, as determined by the control and monitoring system 24. That is, the operating system 38 may determine the project-level object identifier 139 associated with the object 18 upon the introduction of the project to the control and monitoring system 24. Then, the operating system 38 may map the project-level object name 139 into a system-level object name 132. This mapping may be based at least in part on the project identifier 142. For example, the system-level object name 132 may be assigned as TT101-2 when the project-level object name 139 is TT101, and it is the second project in the system, as determined based on the unique project identifier 142. When the project-level object name 139 is changed (e.g., by a user), the operating system 38 may detect the name change and assign a new system-level object name 132 to match the altered name.

In the illustrated embodiment, the project identifier 142 is associated with a project name 146 (e.g., LogixCtrl1) and a project generation identifier 148. The project generation identifier 148 may be employed to ensure that the project's associations between certain project-level object identifiers 140 and project-level object names 139 stored thereon remain valid. Upon reconfiguration of these associations, a new project generation identifier 148 may be provided. In this way, the operating system 38 may generate the object identifier 136 based on the project identifier 142 and the project-level object identifier 140, upon confirmation of the project-level object identifier 140 based on the generation identifier 148. Detection of a change in the project generation identifier 148 can trigger a process to return to the referenced project and, based on the project-level object names 139, update all (one or more) of the corresponding project-level object identifiers 140 associated with the project. This arrangement allows different object identifiers 136 to be assigned for different combinations of project-level object identifiers 140, project identifiers 142, and/or project generation identifiers 148. In this way, the objects 18 may be uniquely identified at a system level, even though project-level object identifiers 140 in two projects may be identical.

FIG. 6 provides an example of two objects 160 and 162 that have the same project-level object identifier 140. The first object 160 includes data relating to a motor (e.g., "Motor1") operated via a first controller (e.g., "Controller-1"). The second object 162 includes data relating to a switch (e.g., "LimitSwitch3") operated via another controller (e.g., "Controller-33"). The two objects 160 and 162 have the same project-level object identifier 140 (e.g., #2). However, the objects 160 and 162 can be disambiguated from each other since they are part of different projects (or devices), which have unique project identifiers 142. Therefore, the objects 160 and 162 are distinguished from one another at the system-level via the object identifiers 136, which are based in part on the project-level object identifiers 140 and the project identifiers 142. This may be especially useful when generating object identifiers 136 for objects 18 in a new project when the project is copied from an already existing project. In addition, if one of the objects 18 is moved from a first project to a second project, the object identifier 136 associated with the object 18 is modified based at least in part on the project identifiers 142 of the first and second projects.

Figure 7:
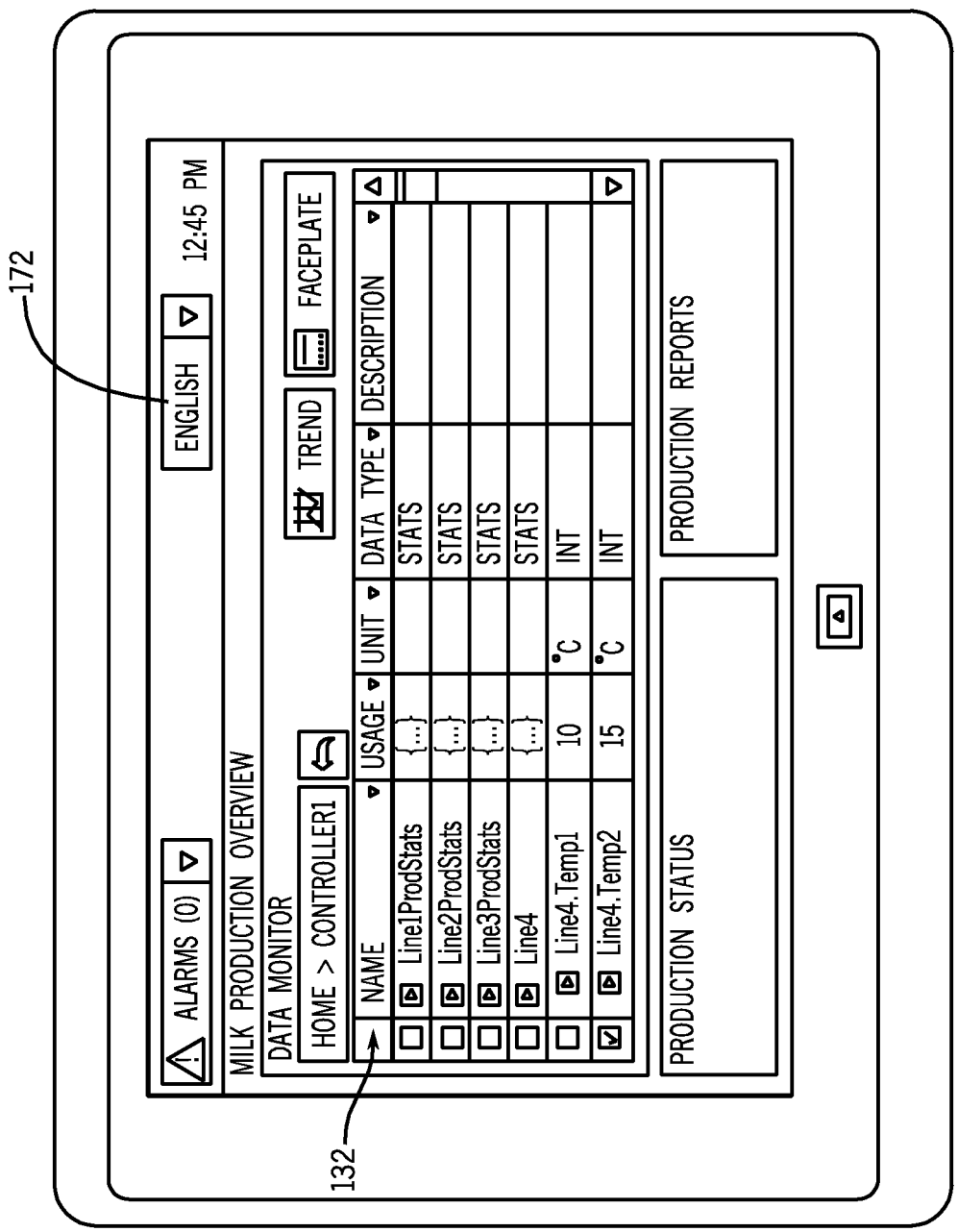
FIG. 7 is a view of a screen that allows language selection for displaying object names in accordance with an embodiment of the present techniques.

The object identifiers 136 are used to access and maintain identity of the objects 18 in the control and monitoring system 24, allowing a user to change the object names 132 associated with the objects 18. As mentioned previously, such changes to the object names 132 may include a change in the localized language for displaying the objects 18. To illustrate this, FIG. 7 is a screen 170 of an HMI 26 used to display data monitored via references to certain objects 18 of the control and monitoring system 24. Since this data is referenced via the inaccessible object identifiers 136, the object names 132 may be altered. A user may select a different localized language via a language selection button 172. When a different language is selected, the object names 132 may update to the new language automatically when the object names 132 are system-assigned. That is, the HMI 26 may include several object names 132 in different languages that are mapped to the same object identifier 136. Consequently, when the new language is selected, the textual information dynamically updates to the proper localized text. Likewise, the text that is displayed on the screen 170 will be displayed in the new language, including the object names 132. This allows the same application 40 of the HMI 26 to be used in multiple countries.

FIG. 8 is a process flow diagram illustrating a method 180 for accessing an object 18 of the control and monitoring system 24. It should be noted that the method 180 may be implemented as a computer or software program (e.g., code or instructions) that may be executed by a processor (e.g., in HMI 26) to execute one or more of the steps of the method 180. Additionally, the program may be stored in any suitable article of manufacture that includes at least one tangible non-transitory, computer-readable medium that at least collectively stores these instructions or routines, such as a memory or storage component of the control and monitoring system 24. The term non-transitory merely indicates that the medium is not a signal.

The method 180 includes determining (block 182), via a processor of the control and monitoring system 24, the object 18 selected by a user. The processor may determine the object 18 based on operator input through the programming terminal 46 or HMI 26, for example. The user may select the object 18 based on the object name 132, which is accessible to the user. The method 180 also includes determining (block 184), via the processor, the object identifier 136 associated with the object 18. The processor may access a data model within the control and monitoring system 24 where the object 18 and object identifier 136 are stored and linked to determine the object identifier 136 associated with the selected object 18. In addition, the method 180 includes determining (block 186) an address of the object 18 based at least in part upon the determined object identifier 136, and accessing (block 188) the object 18 at this address. The object 18 may be accessed at the same address via reference to any number of different object names 132 that point to the same object 18. Such names may identify the object 18 relative to different roots in a hierarchical chain, or based on a name maintained relative to a specific component. The object identifier 136 is persisted across all different possible object names 132 associated with the object 18, allowing a user to reference the same object 18 by selecting any corresponding object name 132.

FIG. 9 is a process flow diagram further specifying steps of block 186 of the method 180 for accessing the object 18. Specifically, FIG. 9 shows how to determine (186) an address for accessing the object 18 when the object 18 is within a specific project run on the control and monitoring system 24. This may include determining (block 190) a project that is hosting the object 18. This is particularly useful for control and monitoring systems 24 that include multiple projects linked to the same HMI 26, especially if the projects include multiple copies of the same project. The project could be determined based on the object identifier 136 of the object 18, since the object identifier 136 is related to both the project-level object identifier 140 and the project identifier 142. In some embodiments, the user may select the project along with the object 18, via the HMI 26 or programming terminal 46. The processor may then determine (block 192) the project identifier 142 associated with the project, and determine (block 194) an address based at least in part on the project identifier 142.

By generating unique object identifiers 136 at the instantiation of objects 18, present embodiments of the control and monitoring system 24 offer several benefits over traditional automation systems for managing data object identity. For example, by managing and persisting references between objects 18 via the object identifiers 136, the system may support a change to the object name 132 of a referenced object without needing to update the objects that reference it. All of the references between the objects 18 of the control and monitoring system 24 may be maintained according to the object identifiers 136. Even if different mechanisms for generating unique project-level or component-level identifiers are used, such differences may be abstracted away by using the same form of identifiers at the system level. Since these object identifiers 136 may be generated in a similar manner and have a similar format, the control and monitoring system 24 may be able to store and browse the object references in a compact and efficient manner. The use of unchanging object identifiers 136 throughout the system also may enable traceability of operations performed on or by the various objects 18, including name changes to the objects 18. Further, the object identifiers 136 allow changes in localized language to extend to the object names 132 displayed on an HMI screen. Projects could be replicated in the HMI 26, even with the same object names 132, without name-change collisions occurring. These benefits, among others, allow the control and monitoring system 24 to operate more efficiently and with less operator intervention to manage data resource identity.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An automation control and monitoring system, comprising:
   an operating system, configured to:
      receive a request for instantiation of an object representing an attribute of the automation control and monitoring system; and
      generate an object identifier when the request for instantiation is received, wherein the object identifier is unique from any other object identifiers employed by the operating system;
   a plurality of components, wherein the plurality of components are configured to facilitate one or more functions of the automation control and monitoring system; and
   a data model distributed to the plurality of components, the data model comprising an association of the object with the generated object identifier such that any component of the plurality of components of the automation control and monitoring system may access the object by referencing the object identifier in a respective local copy of the data model.

2. The automation control and monitoring system of claim 1, wherein the object identifier is unique from any other object identifiers previously generated by the operating system.

3. The automation control and monitoring system of claim 1, wherein the object identifier is inaccessible for an end-user of the automation control and monitoring system.

4. The automation control and monitoring system of claim 1, wherein the operating system is configured to generate the object identifier using a globally unique identifier (GUID) algorithm.

5. The automation control and monitoring system of claim 1, wherein the operating system is configured to:
   receive a request for instantiation of a copy of the object;
   generate a second unique object identifier for association with the copy of the object in the data model; and
   distribute the second unique object identifier to the plurality of components by inserting the second unique object identifier in respective local copies of the plurality of components.

6. The automation control and monitoring system of claim 1, wherein the data model is configured to store an object name associated with the object, wherein the object name is accessible for an end-user such that the end-user is able to access the object by referencing the object name.

7. The automation control and monitoring system of claim 6, wherein the object name is assigned by the end-user.

8. The automation control and monitoring system of claim 6, wherein the object name may be changed by the end-user without affecting operation of any components of the automation control and monitoring system accessing the object.

9. The automation control and monitoring system of claim 8, wherein the object name comprises text provided in a localized language, and the object name may be changed by the end-user selecting a different localized language.

10. The automation control and monitoring system of claim 1, wherein the operating system is configured to:
   identify a project-level object identifier in response to receiving a request for instantiation of an object representing an attribute of a project in the automation control and monitoring system, wherein the project-level identifier is unique from any other project-level identifiers in the project;
   determine a project identifier to identify the project within the automation control and monitoring system, wherein the project identifier is unique from any other project identifiers within the automation control and monitoring system; and
   generate the object identifier based at least in part on the project-level object identifier and the project identifier.

11. The automation control and monitoring system of claim 10, wherein the operating system is configured to:
   determine a project-level object name associated with the object; and
   map the project-level object name into a system-level object name based at least in part on the project identifier of the project.

12. The automation control and monitoring system of claim 11, wherein the operating system is configured to change the system-level object name upon detection of a change in the project-level object name.

13. The automation control and monitoring system of claim 10, wherein the project comprises a generation identifier, and the operating system is configured to generate the object identifier based on the project-level object identifier and the project identifier, upon confirmation of the project-level object identifier based on the generation identifier.

14. The automation control and monitoring system of claim 13, wherein a new project-level object identifier is assigned to the object based on a project-level object name when the generation identifier of the project is changed.

15. The automation control and monitoring system of claim 1, wherein the operating system is configured to:
   generate a first object identifier based at least in part on a first project-level object identifier and a first project identifier; and
   generate a second object identifier based at least in part on a second project-level object identifier and a second project identifier;
   wherein the first and second project-level identifiers have different formats, and the first and second object identifiers have substantially similar formats.

16. An automation control and monitoring system, comprising:
   a data model distributed to a plurality of components of the automation and control and monitoring system, the data model comprising an association of an object representing an attribute of the automation control and monitoring system with an object identifier, wherein the object identifier is generated by an operating system of the automation control and monitoring system and is unique from any other object identifier in the data model; and
   the plurality of components, wherein the plurality of components are configured to facilitate one or more functions of the automation control and monitoring system using the object, by accessing the object by referencing the object identifier in a respective local copy of the data model.

17. The automation control and monitoring system of claim 16, wherein the component is configured to automatically receive a change made to the object by another component of the automation control and monitoring system.

18. The automation control system of claim 17, wherein an end-user of the automation control system is enabled to make changes to the object by referencing an object name associated with the object without accessing the object identifier.

19. The automation control system of claim 18, wherein when the end-user modifies the object name, the component is still able to access the object without intervention by the end-user and the modified object name is distributed to the component.

20. A method for accessing an object in an automation control and monitoring system, comprising:
- determining, via a processor of a component in the automation control and monitoring system, an object selected by an end-user;
- determining, via the processor, an object identifier associated with the object, wherein the object identifier is unique from any other object identifiers in the automation control and monitoring system;
- determining an address of the object based at least in part upon the determined object identifier by accessing a local copy of a data model distributed to the component, the data model comprising the association of the object with the object identifier; and
- accessing the object at the address;
- wherein other copies of the data model are distributed to other components of the automation control and monitoring system.

21. The method of claim 20, comprising:
- determining a project that is hosting the object;
- determining a project identifier for the project; and
- determining the address based at least in part upon the project identifier.

* * * * *